2,916,427

PHOTOCHEMICAL PREPARATION OF UREA

William E. Thompson, Wallingford, Pa., assignor to Sun Oil Company, Philadelphia, Pa., a corporation of New Jersey No Drawing. Application March 15, 1957
Serial No. 646,210

4 Claims. (Cl. 204—158)

This invention relates to a method of making urea and more particularly concerns the photochemical preparation of urea by reacting ammonia and carbon monoxide under the influence of mercury photosensitization.

According to the invention, ammonia and carbon monoxide are caused to react by subjecting a mixture of these reactants, in the presence of mercury vapor, to ultraviolet light having wave length of about 1849 A. and/or 2537 A. Urea is the predominant reaction product.

It is known that mercury vapor will absorb ultraviolet light of the approximate wave lengths 1849 A. and 2537 A. and that the unexcited or ground state mercury atoms will thereby become excited to higher energy levels. I have now found that the excited mercury atoms are capable of causing the reaction of a mixture of ammonia and carbon monoxide with the formation of urea as the predominant product. It is believed that the mechanism of the reaction is represented by the following equations:

(1) $Hg \rightarrow Hg^*$
(2) $Hg^* + NH_3 \rightarrow Hg + NH_2 \cdot + H \cdot$
(3) $2NH_2 \cdot + CO \rightarrow NH_2CONH_2$ Equation 1 indicates that ground state or unexcited mercury atoms are converted to excited atoms by absorption of ultraviolet light having wave length of 1849 A. or 2537 A. or both. As shown by Equation 2, the resulting mercury atoms of higher energy levels collide with and release their energy to the ammonia molecules and thus return to ground state level. The energy absorbed by the ammonia molecules cause them to dissociate into amino and hydrogen radicals. Then, as represented by Equation 3, two amino radicals react with a carbon monoxide molecule and thereby form urea.

The process of the invention thus comprises subjecting a mixture of ammonia and carbon monoxide in vapor phase in the presence of mercury vapor to ultraviolet irradiation having the above-specified wave length. A mercury vapor lamp is employed as the light source for supplying the necessary light energy. Since only a minor amount of mercury vapor need be present, it conveniently may be incorporated in the mixture simply by passing either the ammonia or the carbon monoxide or a mixture of these reactants over liquid mercury prior to entering the reaction zone. Mercury at room temperature has sufficient vapor pressure to supply an adequate amount of mercury vapor for the reaction mixture by operating in this manner. The mixture containing the mercury vapor is then passed into a reaction zone provided with a light source which emits light of the required wave length. Monochromatic light of either 1849 A. or 2537 A. can be employed, or dichromatic light having both wave lengths can be used. Preferably a mercury vapor lamp is installed within the reaction vessel to provide the necessary irradiation. The light energy absorbed by the mercury atoms causes them to become excited and the excited atoms upon collision with ammonia molecules trigger the reactions which result in the formation of urea apparently according to the mechanism described above.

Temperature and pressure conditions for carrying out the reaction are not critical and can be varied widely. Formation of urea according to the invention can readily be effected at room temperature. The reaction can also be conducted at temperatures either considerably below or above room temperature. However, since urea has a melting point of about 271° F., it is preferred to conduct the reaction at a temperature just above this value. This will avoid having urea present in the reaction zone in solid form and thus will prevent deposition of solid urea on the light source and the walls of the reactor. By maintaining the reaction zone at a temperature above the melting point of urea (271° F.) but below a temperature at which its decomposition rate becomes substantial (e.g. below 300° F.), the urea product will be kept in liquid form and will readily flow from the reactor. This avoids any possibility of urea crystals depositing on the mercury lamp and blocking off the light source and also plugging the reactor.

The pressure employed preferably should be at least atmospheric although sub-atmospheric pressures are operative. Superatmospheric pressure likewise can be used and is advantageous in that an increase in pressure promotes the formation of urea from the gaseous reactants. The pressure should not be so high, however, that one or more of the reactants would be in liquid rather than gaseous phase.

The proportion of the reactants fed to the reaction zone preferably should be in the volume ratio of two parts of ammonia to one part of carbon monoxide, since this is the theoretical ratio for the formation of urea. However, other ratios, as for example, from 1:2 to 5:1, can be used if desired. Some by-products not presently identified are formed in the reaction, but urea is the predominant product. While it would seem that formamide ($HCONH_2$) might possibly be formed under the reaction conditions employed, it does not appear to be present in the reaction product to any substantial extent.

The following example specifically illustrates one manner of practicing the invention:

A reactor was constructed from a glass tube of 1 inch diameter and 18 inch length by disposing axially within the tube a General Electric germicidal mercury vapor lamp, plugging the ends of the tube and providing inlet and outlet connections adjacent the ends. The annular space between the lamp and the glass tube, which constituted the reaction zone, had a volume of about 150 cc. Streams of gaseous ammonia and carbon monoxide were continuously admixed at rates of approximately 30 and 15 cc./min. The mixture was passed over liquid mercury to incorporate a minute amount of mercury vapor therein and was then fed into one end of the reaction zone. The mercury vapor lamp was operated with an A.C. current at 56 volts and 0.3 ampere supplying 15 watts, and the light radiation produced was almost entirely of wave length 2537 A. The reaction zone was maintained at a temperature level approximating room temperature and at essentially atmospheric pressure. Under these conditions urea was produced and some of it accumulated as a light grey deposit on the walls adjacent the annular reaction zone. Product which was not retained within the reaction zone passed as effluent into a trap cooled by means of ice. The product collected in the trap constituted white needle shaped crystals and a reddish brown liquid. When this material was stored at dry ice temperature, the entire contents became a mass of white needle shaped crystals. Infra-red and chemical tests showed that the product was urea in admixture with some unidentified by-products. No substantial amount of formamide could be detected in the product.

The foregoing specific example illustrates the preparation of urea under temperature conditions at which crystalline product accumulates in the reaction zone. In a commercial operation under such conditions, it would be necessary to provide means for removing the accumulated urea. This could be done by providing scraping means in the reaction zone or by intermittently flushing with a solvent, such as alcohol or water. However, as previously pointed out, it is preferable to operate the reaction zone at a temperature in the range of 271–300° F. so that the urea formed will be in liquid phase and will readily flow from the reactor.

I claim:

1. Method of making urea which comprises subjecting a vapor phase mixture of ammonia and carbon monoxide, in which the volume ratio of ammonia to carbon monoxide is in the range of from 1:2 to 5:1, in the presence of mercury vapor and at a temperature below about 300° F. to photochemical reaction sensitized by ultraviolet light of wave length emitted by a mercury vapor lamp.

2. Method of making urea which comprises subjecting a vapor phase mixture of ammonia and carbon monoxide, in which the volume ratio of ammonia to carbon monoxide is in the range of from 1:2 to 5:1, in the presence of mercury vapor and at a temperature above the melting point of urea but below about 300° F. to photochemical reaction sensitized by ultraviolet light of wave length emitted by a mercury vapor lamp.

3. Method of making urea which comprises subjecting a vapor phase mixture of ammonia and carbon monoxide, in which the volume ratio of ammonia to carbon monoxide is in the range of from 1:2 to 5:1, in the presence of mercury vapor and at a temperature below about 300° F. to photochemical reaction sensitized by ultraviolet light having wave length mainly of about 2537 A.

4. Method of making urea which comprises subjecting a vapor phase mixture of ammonia and carbon monoxide, in which the volume ratio of ammonia to carbon monoxide is in the range of from 1:2 to 5:1, in the presence of mercury vapor and at a temperature above the melting point of urea but below about 300° F. to photochemical reaction sensitized by ultraviolet light having wave length mainly of about 2537 A.

References Cited in the file of this patent

FOREIGN PATENTS

| 307,406 | Great Britain | Mar. 4, 1929 |
| 321,566 | Great Britain | Nov. 14, 1929 |

OTHER REFERENCES

Ellis et al.: "Chemical Action of Ultraviolet Rays," pages 257 and 258.

Degeering et al.; "An Outline of Organic Nitrogen Compounds."